Figure 1:
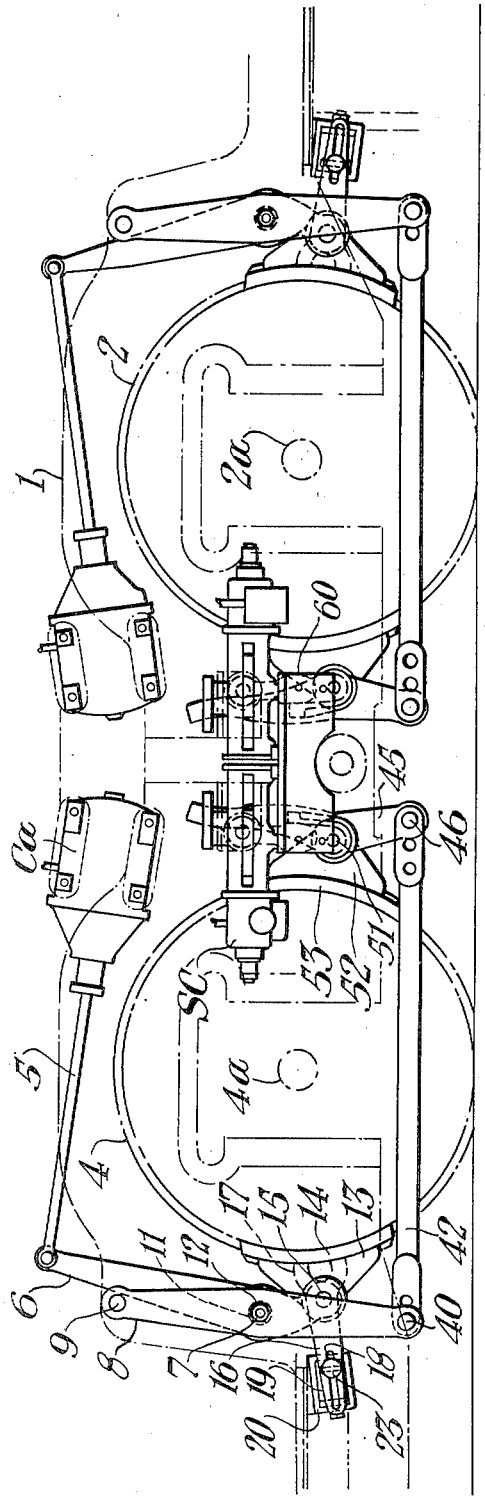

May 2, 1950        E. G. MUELLER        2,505,986
BRAKE RIGGING

Filed April 10, 1946        2 Sheets-Sheet 1

INVENTOR.
Emil G. Mueller.
BY
HIS ATTORNEY

May 2, 1950 E. G. MUELLER 2,505,986
BRAKE RIGGING
Filed April 10, 1946 2 Sheets-Sheet 2

INVENTOR.
Emil G. Mueller.
BY
HIS ATTORNEY

Patented May 2, 1950

2,505,986

UNITED STATES PATENT OFFICE 2,505,986

BRAKE RIGGING

Emil G. Mueller, Churchill Borough, Pa., assignor to The American Brake Company, Swissvale, Pa., a corporation of Missouri Application April 10, 1946, Serial No. 660,997

22 Claims. (Cl. 188—56)

My invention relates to brake rigging for railway rolling stock, and particularly to brake rigging of the unit cylinder clasp type which is particularly suitable for, although in no way limited to, use on the trailer trucks of locomotives.

In a new design of steam turbine electric locomotive the space which in previous designs had been available for brake rigging between the wheels of the trailer truck is taken up by motors and gears which are associated with the axles, and the space which otherwise remains for the brake rigging is limited to such an extent by the frame and other parts of the locomotive that it is extremely difficult to provide the trailer truck with suitable clasp brakes.

One object of my present invention is to provide brake rigging of the unit cylinder clasp type which can be mounted in the limited space available on the trailer truck of a steam turbine electric locomotive of the type described.

Another object of my invention is to provide a clasp brake rigging having a positive release action and in which shoe dragging difficulties are eliminated.

A further object of my invention is to provide a clasp brake rigging of the type described incorporating an automatic slack adjuster.

According to my invention, each wheel of the truck has associated therewith a brake cylinder located above the wheel in the same vertical plane as the wheel as close as possible to the center of the truck. The piston rod of the brake cylinder is inclined upwardly at a slight angle, and is pivotally connected at its free end to the upper end of a floating brake cylinder lever which is pivotally supported intermediate its ends by a pair of laterally spaced transmitting hanger levers, and which brake cylinder lever carries at its lower end a brake head provided with a brake shoe for frictional engagement with the wheel. The transmitting hanger levers are pivotally attached at their upper ends to the truck frame and are operatively connected at their lower ends to a pair of straddle rods. The straddle rods are provided at each end with pin hole take ups, and are pivotally connected at the ends opposite to the transmitting levers with the lower end of a slack adjuster live lever. The slack adjuster live lever, in turn, is pivotally attached to the lower ends of two laterally spaced hangers by means of a pivot pin which also serves to secure to the slack adjuster live lever a brake head carrying a brake shoe for frictional engagement with the adjacent wheel. The upper ends of the hangers, which support the slack adjuster live lever are pivotally attached to the truck frame. The slack adjuster live lever at its upper end is operatively connected by means of a transversely extending vertically offset adjusting lever to an automatic slack adjuster secured to the truck frame outboard of the wheels in a position where the slack adjuster is readily accessible for inspection, adjustment or repair. The brake rigging also includes means for effecting a quick release of the brakes as well as means for preventing the brake shoes from dragging when the brakes are released.

Other objects and characteristic features of my invention will become apparent as the description proceeds.

I shall describe one form of brake rigging embodying my invention, and shall then point out the novel features thereof in claims.

Figure 2:
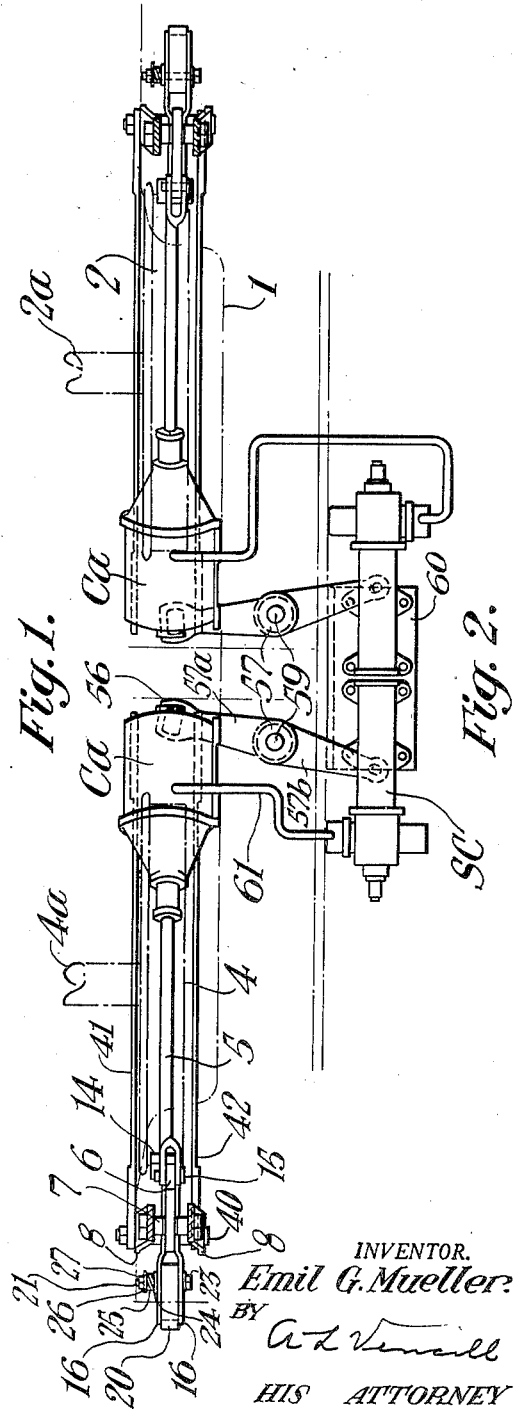
Figure 3:
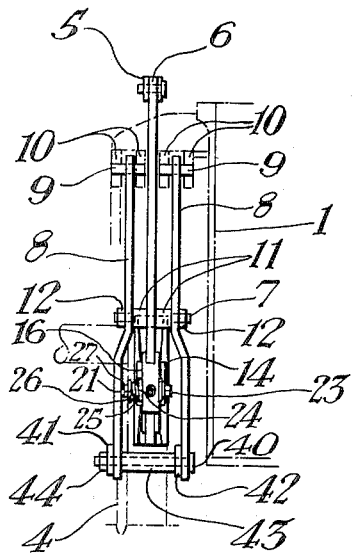
Figure 4:
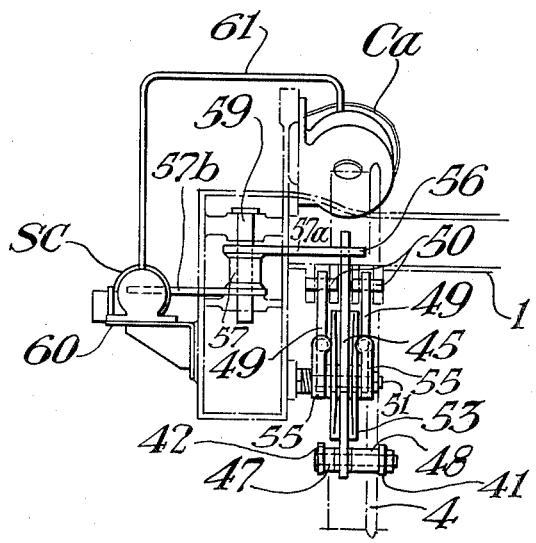
Figure 5:
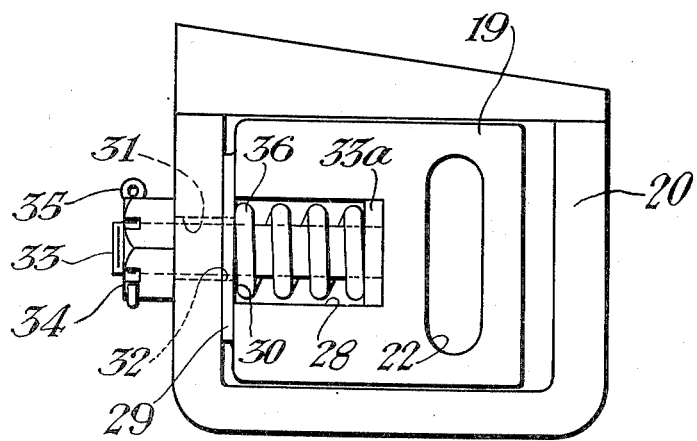

In the accompanying drawings, Fig. 1 is a side elevational view showing brake rigging embodying my invention applied to a four-wheel trailer truck. Fig. 2 is a top plan view of the brake rigging shown in Fig. 1 with some of the parts omitted to simplify and clarify the drawing. Fig. 3 is a left-hand end view of the brake rigging shown in Fig. 1. Fig. 4 is a view of the portion of the brake rigging associated with the left-hand wheel in Fig. 1 as viewed from the right in Fig. 1. Fig. 5 is an enlarged detail view of a portion of brake rigging illustrated in Fig. 1.

Similar reference characters refer to similar parts in each of the several views.

Referring to the drawings, the brake rigging here shown is applied to a four-wheel trailer truck provided with a frame 1 supported at its forward end by a wheel and axle assembly comprising a pair of wheels 2 mounted on an axle 2a, and at its rear end by a wheel and axle assembly comprising a pair of wheels 4 mounted on an axle 4a. The means for supporting the truck frame 1 by the wheel and axle assemblies is not shown because these means are well known and form no part of my present invention.

The brake rigging comprises four separate sets of mechanisms one set of which is provided for each wheel. These mechanisms are similar and it is believed, therefore, that an understanding of the entire brake rigging will be had from a description of the mechanism which is associated with one only of the wheels.

Referring particularly to the mechanism associated with the one wheel 4, for example, this mechanism comprises a brake cylinder Ca, which for clearance reasons, is secured to the frame 1 in an inclined position directly above the wheel 4 in the same vertical plane as the wheel as close as possible to the center of the truck. This brake cylinder is of the usual type, and includes the usual cylinder portion, piston and return spring (not shown), and push rod 5 operated by the piston.

The push rod 5 extends past the wheel and is pivotally connected at its free end to the upper end of a floating brake cylinder lever 6. The floating brake cylinder lever 6 is pivotally mounted intermediate its ends on a pivot pin 7 extending through two laterally spaced depending hanger levers 8 intermediate their ends. The hanger levers 8 are pivotally attached at their upper ends to the truck frame by means of laterally spaced pivot pins 9 (see Fig. 3) mounted in suitable supporting lugs 10 provided on the frame 1 on opposite sides of the floating cylinder lever 6, and are spaced from the floating cylinder lever by means of suitable spacing sleeves 11 provided on the pivot pin 7. The pivot pin 7 is threaded to receive nuts 12 which maintain the parts in place.

The lower end of the floating cylinder lever 6 carries a brake head 13 provided with a brake shoe 14 for frictional engagement with the wheel 4 at one side of the wheel. The brake head is secured to the floating cylinder lever by means of a pivot pin 15 which also serves to secure to the lever 6 friction arms 16. These arms form part of means which I shall now describe for providing a positive release of the brakes following the venting of the brake cylinder Ca to atmosphere after an application of the brakes, and also a means for maintaining the brake shoe 14 in concentric relation with the wheel 4 when the brakes are released.

The friction arms 16 are provided at their right-hand ends, as viewed in Fig. 1, with spaced fingers 17 which cooperate with the inner surface of facing on brake head 13 in such manner that the shoe and arms are constrained to rotate as a unit about the pivot pin 15, and at their opposite ends with longitudinal slots 18. The left-hand ends of the friction arms straddle a release block 19 (see Fig. 5) slidably supported in a supporting member 20 secured to the truck frame. A pin 21 extends through the slots 18 and also through a vertical slot 22 provided in the release block, and is provided at one end with a head 23 and at the other end with a washer 24, a spring 25, a washer 26 and a nut 27 whereby the friction arms are held into frictional engagement with the opposite sides of the release block 19. The release block 19 is provided in its left-hand end with a recess 28 and has welded thereto a plate 29 which forms a shoulder 30 at the outer end of the recess 28. A bolt 33 extends into the recess 28 through an opening 31 formed in the one end of the supporting member 20 and through an aligned opening 32 provided in the plate 29, and is provided at its inner end with a head 33a slidably mounted in the recess 28 and on its outer end with a castellated nut 34 locked in place by a cotter key 35. A compressed coil spring 36 surrounds the shank of the bolt 33 within the recess 28 between the shoulder 30 and the head 33a of the bolt and constantly biases the release block toward the left to the position in which the plate 29 engages the left-hand end of the support 20 as viewed in Fig. 5. It will be apparent, therefore, that the spring 36 will constantly exert on the release block a biasing force which urges the block to the left-hand end of the support 20 as viewed in Fig. 5. The operation of the combined release and brake head balancing means will be described in detail hereinafter.

The lower ends of the transmitting hanger levers 8 are pivotally connected by means of a pivot pin 40 with the left-hand ends of straddle rods 41 and 42 disposed respectively on the inner and outer sides of the wheel 4. The outer straddle rod 42 is mounted on the pivot pin 40 inside of the outer transmitting hanger lever 8, as shown in Fig. 3, and is prevented from moving into engagement with the adjacent side of the wheel 4 by means of a spacing sleeve 43 disposed on the pivot pin 40 between the inner transmitting hanger lever 8 and the straddle rod 42. The inner straddle rod 41 is mounted on the pivot pin adjacent the inner side of the inner hanger lever 8 and is held in place by a nut 44 screwed onto the inner end of the pivot pin.

The straddle rods are provided at each end with pin hole tape ups, and are pivotally connected at the end opposite to the transmitting hanger levers 8 to the lower end of a slack adjuster live lever 45 by means of a pivot pin 46. The straddle rods are maintained in the desired laterally spaced relation with respect to the wheel 4 at the ends which are secured to the slack adjuster live lever 45 by means of spacing sleeves 47 and 48 disposed on opposite sides of the slack adjuster live lever. The slack adjuster live lever 45 extends upwardly between two laterally spaced hangers 49 which are pivotally attached at their upper ends to the truck frame by means of pivot pins 50, and is pivotally connected intermediate its ends to the lower ends of the hangers 49 by means of a pivot pin 51, which pivot pin also serves to secure to the slack adjuster live lever a brake head 52 carrying a brake shoe 53 for frictional engagement with the wheel 4 at the opposite side of the wheel from the brake shoe 14. Associated with the brake head 52 are friction means 55 of well-known construction for maintaining the brake shoe 53 in concentric relation with respect to the wheel 4 when the brakes are released. Since these means form no part of my present invention, it is believed to be unnecessary to describe them in detail herein.

The upper end of the slack adjuster live lever 45 is curved as shown and extends through an eye 56 formed in the one arm 57a of a transversely extending adjusting lever 57. The adjusting lever 57 is pivotally attached intermediate its ends by means of a pivot pin 58 to the truck frame and is provided at its outer end with an arm 57b which for clearance reasons is offset downwardly from the other arm 57a. The free end of the arm 57b is operatively connected with an automatic slack adjuster SC.

The slack adjuster SC is secured through the medium of a mounting bracket 60 to the outer side of the truck frame 1 and is connected to the brake cylinder Ca by a pipe 61. This slack adjuster by itself forms no part of my present invention, and may comprise any of the well-known types which will move the effective point of connection of the outer end of the offset adjusting lever 57 toward the left, as viewed in Fig. 1, a predetermined amount each time that the slack adjuster is supplied with air pressure.

The pipe 61 is connected with the brake cylinder Ca at such a point that as long as no slack is present in the brake rigging the brake cylinder piston in applying the brakes will not move far enough to admit air to the pipe, but that, when slack develops, the additional movement of the piston necessary to fully apply the brakes will then cause fluid pressure to be admitted to the pipe from the pressure side of the piston and will thus cause the slack adjuster to automatically take up the slack.

When it is desired to apply the brakes, fluid pressure is supplied to all four brake cylinders simultaneously. The fluid pressure supplied to the brake cylinder Ca will force the piston rod 5 of this cylinder outwardly toward the left, as viewed in Fig. 1, and hence will cause a corresponding movement of the upper end of the floating brake cylinder lever 6. The movement of the upper end of the lever 6 toward the left, in turn, will cause this lever to fulcrum about the pivot pin 7 until the brake shoe 14 has been moved into engagement with the wheel 4, whereupon the lever 6 will then fulcrum about the pivot pin 15 and will thus cause the transmitting hanger levers 8 to rotate in a clockwise direction about the pivot pins 9. This latter rotation will act through the straddle rods 41 and 42 to move the lower end of the slack adjuster live lever 45 toward the left, and since the upper end of the slack adjuster live lever is held in a fixed position except when slack develops, the movement of the lower end of the slack adjuster live lever 45 toward the left will cause the slack adjuster lever to rotate in a clockwise direction about its point of connection with the adjusting lever 57 to the position in which the brake shoe 53 frictionally engages the wheel 4. The parts are so proportioned that when the brake shoes 14 and 53 have both moved into engagement with the wheel 4, they will exert on the wheel substantially equal and opposite braking forces as is customary in clasp brake designs.

It will be obvious that when the brake shoe 14 moves into engagement with the wheel 4 in response to an application of the brakes, the friction arms 16 will be constrained to move with the brake shoe, and it will be remembered that these friction arms are urged into frictional engagement with the sides of the friction block 19 by a force which depends upon the stiffness of the spring 25 and the adjustment of the nut 27 so that the movement of the brake shoe 14 toward the wheel will cause a force to be exerted on the friction block in opposition to that due to the spring 36. The friction arms 16 are normally clamped against the friction block by the spring 25 in such a position that when the brake rigging is in its released position and the friction block occupies its extreme left-hand position to which it is biased by the spring 36, the brake shoe 14 will be spaced from the wheel 4 a sufficient amount to prevent the brake shoe from dragging, and the stiffness of the spring 25 is such and the nut 27 is so adjusted that the friction block and lever will normally be constrained to move as a unit when the brakes are applied or released, but that, if the movement of the brake shoe 14 necessary to cause a brake application subsequently increases due to brake shoe or wheel wear, the friction arms 16 will then slide relative to the friction block 19 to a new position. It will be seen, therefore, that when the brakes are applied, the friction block 19 will normally be moved toward the right in opposition to the bias of the spring 36, and that consequently when the brakes are subsequently released, the spring 36 will exert a force which will move the brake shoe 14 and the levers 6 and 8 to their proper released positions. The longitudinal slots in the friction arms are sufficiently long to permit the maximum amount of adjustment required for the normal permissible brake shoe and tire wear, and also to prevent damage to the parts in the event of abnormal displacement of the parts for any reason.

It should be particularly pointed out that due to the fact that the friction arms 16 are pivoted on the same pivot pin which fastens the brake head to the floating brake cylinder lever 6 and are provided with fingers which engage the inner surface of facing on brake head 13 the up and down movement of the wheel 4 relative to the frame which takes place due to irregularities in the roadbed will cause the rear end of the friction arms 16 to tend to swing upwardly and downwardly, and it is for the purpose of permitting the necessary movement of these friction arms relative to the friction block 19 and support 22 that the vertical slot 22 is provided in the friction block 19.

It should also be pointed out that due to the inclined position of the arms 16, the brake shoe 14 will be held concentric to the wheel 4 when the brakes are released, thus preventing brake shoe dragging difficulties.

It will be obvious that if slack develops in the brake rigging, the resultant additional movement of the piston of the brake cylinder Ca necessary to effect a brake application will act to admit fluid pressure to the slack adjuster SC in the manner outlined hereinbefore, and the fluid pressure thus admitted to the slack adjuster will cause the fulcrum block of the slack adjuster to move toward the right and thus rotate the offset adjusting lever in a counterclockwise direction as viewed in Fig. 1, a sufficient amount to take up the slack.

One advantage of brake rigging embodying my invention is that relatively few parts are required, which parts are all disposed in positions where they are accessible and have ample clearances irrespective of the fact that the available space for the brake rigging is extremely limited for the reasons pointed out hereinbefore.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. In a brake rigging, the combination with a truck frame and a supporting wheel therefor, of hangers pivotally supported from said frame on one side of said wheel and hanger levers pivotally supported from said frame on the other side of said wheel, a slack adjuster live lever and a brake cylinder lever pivotally supported intermediate their ends by means of said hangers and hanger levers respectively, means connecting said hanger levers with one end of said slack adjuster live lever, a relatively fixed fulcrum for the other end of said slack adjuster live lever, means for frictionally engaging the opposite sides of said wheel carried by said brake cylinder lever and said live lever, and a brake cylinder connected with said brake cylinder lever.

2. In a brake rigging, the combination with a truck frame and a supporting wheel therefor, of a hanger pivotally suspended from the truck frame at one side of said wheel, a slack adjuster live lever pivotally attached intermediate its ends to the lower end of said hanger, relatively fixed fulcrum means for the upper end of said slack adjuster live lever, a hanger lever pivotally suspended from the truck frame at the other side of said wheel, means connecting the lower end of said slack adjuster live lever with the lower end of said hanger lever, a brake cylinder lever pivotally attached intermediate its ends to said hanger lever intermediate its ends, means secured to the lower end of said brake cylinder lever and to said slack adjuster live lever intermediate its ends for frictionally engaging said wheel, and a brake cylinder operatively connected with the upper end of said brake cylinder lever.

3. In a brake rigging, the combination with a truck frame and a supporting wheel therefor, of hangers pivotally supported from said frame at one side of said wheel and hanger levers pivotally supported from said frame at the other side of said wheel, a slack adjuster live lever and a brake cylinder lever pivotally supported intermediate their ends by means of said hangers and hanger lever respectively, means connecting said hanger levers with one end of said slack adjuster live lever, an automatic slack adjuster operatively connected with the other end of said live lever, means for frictionally engaging the opposite sides of said wheel carried by said brake cylinder lever and said live lever, and a brake cylinder connected with said brake cylinder lever.

4. In a brake rigging, the combination with a truck frame and a supporting wheel therefor, of a hanger pivotally supported from said frame at one side of said wheel and a hanger lever pivotally suspended from the truck frame at the other side of said wheel, a slack adjuster live lever pivotally attached intermediate its ends to the lower end of said hanger, an automatic slack adjuster operatively connected with the upper end of said slack adjuster live lever, means connecting the lower end of said slack adjuster live lever with the lower end of said hanger lever, a brake cylinder lever pivotally attached intermediate its ends to said hanger lever intermediate its ends, means secured to the lower end of said brake cylinder lever and to said slack adjuster live lever intermediate its ends for frictionally engaging said wheel, and a brake cylinder operatively connected with the upper end of said brake cylinder lever.

5. In a brake rigging, the combination with a truck frame and a supporting wheel therefor, of hangers and hanger levers pivotally supported respectively from said frame at opposite sides of said wheel, a slack adjuster live lever and a brake cylinder lever pivotally supported respectively intermediate their ends by means of said hangers and hanger levers, means connecting said hanger levers with one end of said slack adjuster live lever, an automatic slack adjuster secured to said frame outboard of the wheels, a transversely extending adjusting lever pivotally supported intermediate its ends and operatively connecting said slack adjuster with the other end of said live lever, means for frictionally engaging the opposite sides of said wheel carried by said brake cylinder lever and said live lever, and a brake cylinder connected with said brake cylinder lever.

6. In a brake rigging, the combination with a truck frame and a supporting wheel therefor, of a hanger pivotally suspended from the truck frame at one side of said wheel and a hanger lever pivotally suspended from the truck frame at the other side of said wheel, a slack adjuster live lever pivotally attached intermediate its ends to the lower end of said hanger, an automatic slack adjuster secured to said frame outboard of the wheels, a transversely extending adjusting lever pivotally supported intermediate its ends and operatively connecting said slack adjuster with the other end of said live lever, means connecting the lower end of said slack adjuster live lever with the lower end of said hanger lever, a brake cylinder lever pivotally attached intermediate its ends to said hanger lever intermediate the ends of said hanger lever, means secured to the lower end of said brake cylinder lever and to said slack adjuster live lever intermediate its ends for frictionally engaging said wheel, and a brake cylinder operatively connected with the upper end of said brake cylinder lever.

7. In a brake rigging, the combination with a vehicle frame and a supporting wheel therefor, of a pair of hangers pivotally suspended from said frame at one side of said wheel, a slack adjuster live lever pivotally supported intermediate its ends between said hangers by means of a pivot pin mounted in the lower ends of said hangers, a brake head carrying a brake shoe for frictionally engaging one side of said wheel mounted on said pivot pin, slack adjusting means operatively connected with the upper end of said slack adjuster live lever, a pair of transmitting hanger levers pivotally suspended from said frame at the other side of said wheel and operatively connected at their lower ends by means of straddle rods with the lower end of said slack adjuster live lever, a floating brake cylinder lever pivotally supported intermediate its ends between said transmitting hanger levers intermediate their ends, a brake head carrying a brake shoe for frictional engagement with the other side of said wheel pivotally attached to the lower end of said brake cylinder lever, and a brake cylinder operatively connected with the upper end of said brake cylinder lever.

8. In a brake rigging, the combination with a vehicle frame and a supporting wheel therefor, of a pair of hangers pivotally suspended from said frame at one side of said wheel, a slack adjuster live lever pivotally supported intermediate its ends between said hangers by means of a pivot pin mounted in the lower ends of said hangers, a brake head carrying a brake shoe for frictionally engaging one side of said wheel mounted on said pivot pin, an automatic slack adjuster operatively connected with the upper end of said slack adjuster live lever, a pair of transmitting hanger levers pivotally suspended from said frame at the other side of said wheel and operatively connected at their lower ends by means of straddle rods with the lower end of said slack adjuster live lever, a floating brake cylinder lever pivotally supported intermediate its ends between said transmitting hanger levers intermediate their ends, a brake head carrying a brake shoe for frictional engagement with the other side of said wheel pivotally attached to the lower end of said brake cylinder lever, and a brake cylinder operatively connected with the upper end of said brake cylinder lever.

9. In a brake rigging, the combination with a vehicle frame and a supporting wheel therefor, of a pair of hangers pivotally suspended from said frame at one side of said wheel, a slack adjuster live lever pivotally supported intermediate its ends between said hangers by means of a pivot pin mounted in the lower ends of said hangers, a brake head carrying a brake shoe for frictionally engaging one side of said wheel mounted on said pivot pin, an automatic slack adjuster, a transversely extending adjusting lever pivotally supported intermediate its ends and having one arm offset upwardly and operatively connected with said slack adjuster live lever and the other arm offset downwardly and operatively connected with said slack adjuster, a pair of trasmitting hanger levers pivotally suspended from said frame at the other side of said wheel and operatively connected at their lower ends by means of straddle rods with the lower end of said slack adjuster live lever, a floating brake cylinder lever pivotally supported intermediate its ends between said transmitting hanger levers intermediate their ends, a brake head carrying a brake shoe for frictional engagement with the other side of said wheel pivotally attached to the lower end of said brake cylinder lever, and a brake cylinder operatively connected with the upper end of said brake cylinder lever.

10. In a brake rigging, the combination with a vehicle frame and a supporting wheel therefor, of a pair of hangers pivotally suspended from said frame at one side of said wheel, a slack adjuster live lever pivotally supported intermediate its ends between said hangers by means of a pivot pin mounted in the lower ends of said hangers, a brake head carrying a brake shoe for frictionally engaging one side of said wheel mounted on said pivot pin, an automatic slack adjuster mounted on said frame outboard of said wheels, an adjusting lever pivotally mounted intermediate its ends on a vertical pivot pin and having two vertically offset arms one of which is operatively connected with said slack adjuster and the other of which is operatively connected with said slack adjuster live lever, a pair of transmitting hanger levers pivotally suspended from said frame at the other side of said wheel and operatively connected at their lower ends by means of straddle rods with the lower end of said slack adjuster live lever, a floating brake cylinder lever pivotally supported intermediate its ends between said transmitting hanger levers intermediate their ends, a brake head carrying a brake shoe for frictional engagement with the other side of said wheel pivotally attached to the lower end of said brake cylinder lever, and a brake cylinder operatively connected with the upper end of said brake cylinder lever.

11. In a brake rigging, the combination with a truck frame and a supporting wheel therefor, a pair of transmitting hanger levers suspended from the truck frame, a floating brake cylinder lever pivotally supported intermediate its ends between said hanger levers intermediate their ends, means for frictionally engaging one side of the wheel carried by the lower end of said brake cylinder lever, a brake cylinder operatively connected with the upper end of said brake cylinder lever, and means for frictionally engaging the other side of said wheel operatively connected with said transmitting hanger levers at their lower ends.

12. In a brake rigging, the combination with a truck frame and a supporting wheel therefor, of a pair of transmitting hanger levers suspended from the truck frame, a floating brake cylinder lever pivotally supported intermediate its ends between said hanger levers intermediate their ends, a brake head carrying a brake shoe for frictionally engaging one side of said wheel pivotally attached to the lower end of said brake cylinder lever, a brake cylinder operatively connected with the upper end of said brake cylinder lever, means for frictionally engaging the other side of said wheel operatively connected with said transmitting hanger levers at their lower ends, and means operatively associated with said brake cylinder lever and said brake head for biasing the parts to released positions and for maintaining said brake shoe in concentric relation to the wheel when the parts are in their released positions.

13. In a brake rigging, the combination with a truck frame and a supporting wheel therefor, of a pair of transmitting hanger levers pivotally attached at their upper ends to said truck frame in parallel spaced relation at the outer side of the wheel, a floating brake cylinder lever pivotally supported intermediate its ends between said hanger levers by means of a pivot pin mounted in said hanger levers intermediate their ends, a brake cylinder mounted on the truck frame in the same plane as said wheel above the wheel at the inner side of the wheel in an inclined position and provided with a piston rod the free end of which is operatively connected with the upper end of said brake cylinder lever, means for frictionally engaging the outer side of the wheel operatively connected with the lower end of said brake cylinder lever, and means for frictionally engaging the inner side of said wheel operatively connected with the lower ends of said hanger levers.

14. In a brake rigging, the combination with a truck frame and a supporting wheel therefor, of a pair of transmitting hanger levers pivotally attached at their upper ends to said truck frame in parallel spaced relation at the outer side of the wheel, a floating brake cylinder lever pivotally supported intermediate its ends between said hanger levers by means of a pivot pin mounted in said hanger levers intermediate their ends, a brake cylinder mounted on the truck frame in the same plane as said wheel above the wheel at the inner side of the wheel in an inclined position and provided with a piston rod the free end of which is operatively connected with the upper end of said brake cylinder lever, means for frictionally engaging the outer side of the wheel operatively connected with the lower end of said brake cylinder lever, and means for frictionally engaging the inner side of said wheel operatively connected with the lower ends of said hanger levers by means of rods straddling said wheel.

15. In a brake rigging, the combination with a truck frame and a supporting wheel therefor, of a pair of transmitting hanger levers pivotally attached at their upper ends to said truck frame in parallel spaced relation at the outer side of the wheel, a floating brake cylinder lever pivotally supported intermediate its ends between said hanger levers by means of a pivot pin mounted in said hanger levers intermediate their ends, a brake cylinder mounted on the truck frame in the same plane as said wheel above the wheel at the inner side of the wheel in an inclined position and provided with a piston rod the free end of which is operatively connected with the upper end of said brake cylinder lever, means for frictionally engaging the outer side of the wheel operatively connected with the lower end of said brake cylinder lever, and means including straddle rods connected with the lower ends of said hanger lever and a slack adjuster live lever connected at one end with said straddle rods for frictionally engaging said wheel at the inner side of the wheel.

16. In a brake rigging, the combination with a truck frame and a supporting wheel therefor, of hangers pivotally suspended from the truck frame at one side of said wheel and hanger levers pivotally suspended from the truck frame at the other side of said wheel, a slack adjuster live lever pivotally supported intermediate its ends by said hangers and operatively connected at one end by means of straddle rods with the lower ends of said hanger levers, a brake cylinder live lever pivotally supported intermediate its ends by said hanger levers intermediate the ends of the hanger levers, a brake cylinder operatively connected with the upper end of said brake cylinder lever, a slack adjuster operatively connected with the upper end of said slack adjuster live lever, and brake shoes for engaging the opposite sides of said wheel secured respectively to the lower end of said brake cylinder lever and to said slack adjuster live lever intermediate its ends.

17. In a brake rigging, the combination with a truck frame and a supporting wheel therefor, of hangers pivotally suspended from the truck frame at one side of said wheel and hanger levers pivotally suspended from the truck frame at the other side of said wheel, a slack adjuster live lever pivotally supported intermediate its ends by said hangers and operatively connected at one end by means of straddle rods with the lower ends of said hanger levers, a brake cylinder live lever pivotally supported intermediate its ends by said hanger levers intermediate their ends, a brake head carrying a brake shoe for frictional engagement with one side of said wheel pivotally attached to said live lever by means of the same pivot pin which pivotally supports said live lever, a brake head carrying a brake shoe for frictionally engaging the other side of said wheel pivotally attached to the lower end of said brake cylinder lever, and brake release means connected to the lower end of said brake cylinder lever by means of the same pivot pin which secures said last mentioned brake head to said brake cylinder lever.

18. In a brake rigging, the combination with a truck frame and a supporting wheel therefor, of hangers pivotally suspended from the truck frame at one side of said wheel and hanger levers pivotally suspended from the truck frame at the other side of said wheel, a slack adjuster live lever pivotally supported intermediate its ends by said hangers and operatively connected at one end by means of straddle rods with the lower ends of said hanger levers, a brake cylinder live lever pivotally supported intermediate its ends by said hanger levers, a brake head carrying a brake shoe for frictional engagement with one side of said wheel pivotally attached to said live lever by means of the same pivot pin which pivotally supports said live lever, a brake head carrying a brake shoe for frictionally engaging the other side of said wheel pivotally attached to the lower end of said brake cylinder lever, and brake release means connected to the lower end of said brake cylinder lever by means of the same pivot pin which secures said last mentioned brake head to said brake cylinder lever, said brake release means being constructed to provide a predetermined clearance between the brake shoes and the wheels irrespective of brake shoe or wheel wear.

19. In a brake rigging for applying clasp brakes to a vehicle wheel, the combination with a brake cylinder lever pivotally supported intermediate its ends by means of hangers suspended from the truck frame and operatively connected at one end with a brake cylinder and provided at the other end with a brake head carrying a brake shoe for frictionally engaging the wheel, of two friction arms pivotally supported intermediate their ends in parallel spaced relation on the same pivot pin which serves to secure said brake head to said brake cylinder lever and provided at one end with means engaging said brake head in such manner that said head and said friction arms are constrained to rotate as a unit about said pivot pin, a friction block slidably supported in a fixed support between the other ends of said friction arms for limited movement along a line parallel to the axis of said friction arms when said brake head is in brake applying position, means biasing said block away from the wheel, longitudinal slots formed in said friction arms opposite said block, a vertical slot formed in one end of said block, and a pin passing through the slots in said friction arms and the slot in said block and provided with means for causing said friction arms to frictionally engage the opposite sides of said block.

20. In a brake rigging for applying clasp brakes to a vehicle wheel, the combination with a brake cylinder lever pivotally supported intermediate its ends by means of hangers suspended from the truck frame and operatively connected at one end with a brake cylinder and provided at the other end with a brake head carrying a brake shoe for frictionally engaging the wheel, of two friction arms pivotally supported intermediate their ends in parallel spaced relation on the same pivot pin which serves to secure said brake head to said brake cylinder lever and provided at one end with means engaging said brake head in such manner that said head and said friction arms are constrained to rotate as a unit about said pivot pin, a friction block slidably supported in a fixed support between the other ends of said friction arms for limited movement along a line parallel to the axis of said friction arms when said brake head is in brake applying position, means biasing said block away from the wheel, and means for causing said friction arms to frictionally engage the opposite sides of said block, whereby the parts are biased to brake releasing positions through the medium of said block irrespective of brake shoe or wheel wear.

21. In a brake rigging for a four-wheel trailer truck, the combination with each wheel of the truck of hangers pivotally suspended from the truck frame on one side of the wheel and hanger levers suspended from the truck frame on the other side of the wheel, a slack adjuster live lever pivotally supported intermediate its ends by said hangers and operatively connected at one end by means of straddle rods with the lower ends of said hangar levers, a brake cylinder live lever pivotally connected intermediate its ends with said hanger levers, a brake cylinder operatively connected with the upper end of said brake cylinder lever, a slack adjuster operatively connected with the upper end of said slack adjuster live lever, and brake shoes for engaging the opposite sides of said wheel secured respectively to the lower end of said brake cylinder lever and to said slack adjuster live lever intermediate its ends.

22. In a brake rigging, the combination with a truck frame and a supporting wheel therefor, of a pair of hangers suspended from the truck frame at one side of the wheel, a slack adjuster live lever pivotally supported intermediate its ends in the lower ends of said hangers, a brake head carrying a brake shoe for frictionally engaging the wheel attached to said live lever at its point of connection to said hangers, an automatic slack adjuster secured to the truck frame outboard of the wheels, an offset adjusting lever pivotally supported in a horizontal plane and operatively connected at one end with said slack adjuster and at the other end with the upper end of said slack adjuster live lever, and means connected with the lower end of said live lever to move it to brake applying and released positions.

EMIL G. MUELLER.

REFERENCES CITED

The following references are of record in the file of this patent:

UNITED STATES PATENTS

| Number | Name | Date |
|---|---|---|
| 722,930 | Wadey | Mar. 17, 1903 |
| 1,307,165 | Turner | June 17, 1919 |
| 1,422,125 | Pehrson | July 11, 1922 |
| 2,163,534 | Baselt | June 20, 1939 |
| 2,245,408 | McGowan | June 10, 1941 |